(12) United States Patent
Kaura

(10) Patent No.: US 6,623,544 B1
(45) Date of Patent: Sep. 23, 2003

(54) AIR PURIFICATION SYSTEM AND METHOD OF OPERATION

(76) Inventor: Kamaljit S. Kaura, 22991 La Cadena Dr., Laguna Hills, CA (US) 92653-1314

( * ) Notice: Subject to any disclaimer, the term of this patent is extended or adjusted under 35 U.S.C. 154(b) by 0 days.

(21) Appl. No.: 10/286,124

(22) Filed: Oct. 31, 2002

(51) Int. Cl.[7] .......................... B03C 3/011; B03C 3/016
(52) U.S. Cl. ...................... 95/3; 96/16; 96/57; 96/224; 96/19; 422/24; 422/121; 422/186.04; 55/DIG. 32; 95/69
(58) Field of Search ............................ 96/16, 224, 57, 96/58, 19; 95/57, 69, 3; 422/22, 24, 121, 186.04; 55/DIG. 32; 204/157.21, 157.22

(56) References Cited

U.S. PATENT DOCUMENTS

| | | | |
|---|---|---|---|
| 4,750,917 A | * 6/1988 | Fujii | 95/69 |
| 4,997,278 A | 3/1991 | Finlan et al. | 356/128 |
| 5,054,480 A | 10/1991 | Bare et al. | 128/201.25 |
| 5,154,733 A | * 10/1992 | Fujii et al. | 95/57 |
| 5,431,714 A | * 7/1995 | Burtscher et al. | 95/6 |
| 5,535,741 A | 7/1996 | Widerstrom et al. | 128/206.21 |
| 5,590,646 A | 1/1997 | Murphy | 128/206.29 |
| 5,616,172 A | * 4/1997 | Tuckerman et al. | 96/16 |
| 5,681,374 A | * 10/1997 | Von Glehn | 96/16 |
| 5,766,934 A | 6/1998 | Guiseppi-Elie | 435/287.9 |
| 5,833,740 A | * 11/1998 | Brais | 96/16 |
| 5,874,701 A | * 2/1999 | Watanabe et al. | 204/157.15 |
| 5,993,738 A | * 11/1999 | Goswani | 422/22 |
| 6,016,197 A | 1/2000 | Krivoshlykov | 356/345 |
| 6,117,686 A | 9/2000 | Tanaka et al. | 436/167 |
| 6,149,717 A | * 11/2000 | Satyapal et al. | 96/16 |
| 6,316,268 B1 | 11/2001 | Yang et al. | 436/106 |
| 6,319,540 B1 | 11/2001 | Van Antwerp et al. | 427/2.13 |
| 6,322,614 B1 | * 11/2001 | Tillmans | 96/16 |
| 6,322,963 B1 | 11/2001 | Bauer | 435/4 |
| 6,338,340 B1 | 1/2002 | Finch et al. | 128/205.27 |
| 6,464,760 B1 | * 10/2002 | Sham et al. | 96/117.5 |
| 6,494,940 B1 | * 12/2002 | Hak | 96/224 |

* cited by examiner

Primary Examiner—Richard L. Chiesa
(74) Attorney, Agent, or Firm—Gene Scott-Patent Law & Venture Group

(57) ABSTRACT

A housing for purifying an air flow moving through it provides a reception space for receiving the air flow. The air is treated with mechanical filtration of particles larger than approximately 2 micron, ionizing with energetic ions, exposure to ultraviolet light radiation, and electrostatic precipitation of particles in the air inflow. The ionizing and UV bombardment of the air inflow occur simultaneously.

13 Claims, 4 Drawing Sheets

AIR PURIFICATION SYSTEM AND METHOD OF OPERATION

BACKGROUND OF THE INVENTION

INCORPORATION BY REFERENCE: Applicant(s) hereby incorporate herein by reference, any and all U. S. patents, U.S. patent applications, and other documents and printed matter cited or referred to in this application.

1. Field of the Invention

This invention relates generally to air filtering systems and more particularly to a system and method for providing air purified of chemical and biological agents.

2. Description of Related Art

The following art defines the present state of this field:

Finlan, et al., U.S. Pat. No. 4,997,278 describes a sensor using the principle of surface plasmon resonance (SPR) to monitor the progress of the reaction between a sample and a sensitive layer (for example an antibody layer). The layer is applied to the rear surface of a metallic film formed on the surface of an optically transmissive component in the form of a hemicylindrical lens and slide. Collimated light from a source is applied via a lens which focuses the incoming beam to a focus at a point to form a fan-shaped spread of light incident at the point. The light is internally reflected at the point, and emerges from the component to be applied to a dectector array which latter is electronically scanned. The angle of incidence of the light at the point is such as to span that angle which gives rise to surface plasmon resonance, together with a range of angles thereabout so that the progress of the resonant condition, as the reaction between the sample and the sensitive layer proceeds, can be monitored. Bare, et al. U.S. Pat. No. 5,054,480 An air flow and filtration control system in the form of a headgear which is worn by a physician during a surgical procedure, a technician during an assembly process, or any other user wherein a controlled air flow and air filtration is required or desired. The flow through system includes a relatively rigid, open frame, skeleton headgear structure which substantially surrounds the head of the wearer. The structure includes ductwork and is adjustably attached to a headband formed of straps which are adapted to snugly engage the head of the wearer. A plurality of fans or other air moving devices are mounted in the structure. The fans are positioned to move air through the integral ducts in the structure. A shroud (or hood) is draped over and attached to the structure in such a fashion as to completely cover the structure and to cover at least a portion of the wearer in order to maintain sterile or controlled conditions. A relatively planar transparent screen or "window" is provided at the front of the apparatus for substantially undistorted viewing. Typically, the transparent screen is mounted in the shroud and is removable therewith. Filtration devices are formed or mounted in the shroud so as to be disposed adjacent to the fans when the shroud is placed over the structure. A suitable power supply, such as a battery pack or the like, is used to selectively power the fans. It is anticipated that at least the shroud (and the components mounted thereto) will be disposable.

Widerstrom, et al. U.S. Pat. No. 5,535,741 discloses face mask is provided which is adapted to be mounted an inhalation device, e.g., an inhaler or spacer, having a body. The mask includes an annular adaptor part which is to be connected to one end of the body, and a funnel-shaped face engaging portion having a narrow end that is joined to one end of the adaptor part. The wide end of the face engaging portion has a free edge that is adapted to engage the face of an infant around the infant's mouth and at least a part of the infant's nose, and is resilient so that it is adaptable to the shape of the infant's face. The free edge of the wide end of the face engaging part is provided substantially entirely in a plane which forms an angle of about 10.degree.–25.degree. with a plane perpendicular to the extended longitudinal axis of the adaptor part.

Murphy, U.S. Pat. No. 5,590,646 discloses an emergency safety mask including a flexible porous material capable of readily absorbing liquids and passing air therethrough, elongated elastic generally formed as the letter "X" and joined at the intersection thereof is affixed to the flexible porus material, with two arms of the "X" affixed to the upper portion of the material and two arms being adapted to be affixed to the lower portion of the material, forming a flexible circularly-shaped band adapted to be placed over the head of a user. Each of the upper bands includes a clip device as part of the affixing mechanism suitable for retaining a miniature source of light (flashlight), and a second clip device removably retains a frangible liquid container.

Guiseppi-Elie, U.S. Pat. No. 5,766,934 describes chemical and biological sensors that convert the chemical potential energy of an analyte into a proportionate electrical signal through the transducer action of a microfabricated device with an integral electroconductive polymer film. The microsensor devices possess a coplanar arrangement of at least one, and typically three, microfabricated interdigitated microsensor electrode arrays each with line and space dimensions that may range from 2–20 .mu.m and is typically 10 .mu.m, a platinized platinum counter electrode of area at least 10 times the area of the interdigitated microsensor electrode array and a chloridized silver/silver chloride reference electrode. Chemical and biological sensors constructed according to the present invention employ a thin electrically conducting polymer film that is specifically attached via covalent bond formation to the interdigitated microsensor electrode component of the devices. The electrically conducting polymer film is formed in three layers, the first layer possesses high electrical conductivity and is covalently attached to the device surface, the second layer possess an inorganic catalyst and is covalently attached to the first, and the third layer possesses an indicator molecule which may be a bioactive molecule such as an enzyme or member of specific binding pair of biological origin and is itself covalently attached to the second layer. Binding of an analyte or member of the specific binding pair reagent may result in a change in the electrical impedance (resistance and capacitance or both) of the highly electrically conducting layer. The electrical change in the polymer layers is a sensitive measure of the extent of binding of the binding agent and forms an analytical signal for the binding agent.

Krivoshlykov, U.S. Pat. No. 6,016,197 describes an optical spectrum analyzer that is based on optical processing of the far field interference pattern from two beams irradiated by light transmitting waveguides. The spectrum analyzer can operate in UV, VIS, NIR and MIR ranges of spectrum and it can be based on either optical fibers (multimode or single-mode) or integrated optical waveguides. It has many important applications, for example, as a simple, compact and inexpensive spectrum analyzer used with fiber optic chemical and biological sensors.

Tanaka, et al. U.S. Pat. No. 6,117,686 describes a method by which harmful trace gases in a gaseous mixture containing as such harmful halogen gases, halogenated hydrogen gases, acid gases, oxidizing gases, basic gases, organic acid gases, especially halogen gases or halogenated hydrogen gases, are detected by using tetraphenylporphyrin (TPP) and quantitated from a calibration curve constructed therefrom, where the range of detectable concentration is made adjustable so that harmful gas can be detected and quantitated over a broad range of concentration. Furthermore, this invention also provides a method for extending the accessible range of gas concentration by adjusting the sensitivity of the detector material via control of tetraphenylporphyrin concentration in matrix polymer of the detector material, by controlling the gas concentration range via measurement at a specific wavelength(s), and by the use of a plurality of detector materials with pre-set assay sensitivity.

Yang, et al., U.S. Pat. No. 6,316,268 describes an article of manufacture including a substrate having an oxide surface layer and a layer of a cyclodextrin derivative chemically bonded to said substrate, said layer of a cyclodextrin derivative adapted for the inclusion of selected compounds, e.g., nitro-containing organic compounds, therewith. Such an article can be a chemical microsensor capable of detecting a resultant mass change from inclusion of the nitro-containing organic compound.

Van Antwerp, et al. U.S. Pat. No. 6,319,540 describes methods for the determination of the concentration of biological levels of polyhydroxylated compounds, particularly glucose. The methods utilize an amplification system that is an analyte transducer immobilized in a polymeric matrix, where the system is implantable and biocompatible. Upon interrogation by an optical system, the amplification system produces a signal capable of detection external to the skin of the patient. Quantitation of the analyte of interest is achieved by measurement of the emitted signal. Specifically, the analyte transducer immobilized in a polymeric matrix can be a boronic acid moiety.

Bauer, U.S. Pat. No. 6,322,963 describes a sensor for detecting analytes. Analyte presence or concentration is determined through measurement of changes in induced electromotive force, current or other electrical property in a base member during analyte exposure to the sensor. According to one class of embodiments, the present device immobilizes natural or synthetic macromolecules sufficiently close to an electrically-conductive base member to insure that any alteration in the motion and/or electrostatic fields of the macromolecules during interaction with a predetermined analyte will induce an increased electromotive force in the base member.

Finch, et al. U.S. Pat. No. 6,338,340 discloses a filter mask for use in environments of smoke and toxic gas which includes a filter element having a filling of shiftable bodies coated with a flowable, aloe vera extract having a gel-like viscosity and a retainer for holding the filter element over the mouth and nose of the wearer. The coating has a pH level which is alkaline which aids in the reduction of toxic gases such as hydrogen cyanide, hydrogen chloride and acrolein inhaled by the wearer. The filter element is preferably replacably mounted to the retainer, and may be provided as a bag-like flexible fabric container adapted to shift so as to conform to the face of the wearer. The filter element itself is adaptable to a variety of different uses for removing smoke particulates and toxic gases from air flowing therethrough.

The prior art teaches a variety of personal and building structure air filtration and purification devices but does not teach such a device combining mechanical, ionic, electrostatic and radiant processing of air flow. The present invention fulfills these needs and provides further related advantages as described in the following summary.

SUMMARY OF THE INVENTION

The present invention teaches certain benefits in construction and use which give rise to the objectives described below.

A housing for purifying air provides a reception space for receiving an air inflow. The inflow receives mechanical filtration of particles larger than approximately 2 micron, ionizing with energetic ions, UV bombardment with ultraviolet light radiation, and electrostatic precipitation of particles in the air inflow. The ionizing and UV bombardment of the air inflow occur simultaneously. Electronic metering and control systems control the amount of makeup air between 7 and 20 percent. Air intake control is critical especially with a highly contaminated environment containing airborne biological and chemical agents. Signals from a bank of sensors characterize environmental conditions and adjust makeup air percentage accordingly so as not to overload air purification capability and to provide maximum possible operation for given conditions.

Electronic metering identifies and controls the percent of makeup air, air temperature, pressure and flow rate, contaminating agents present, power available and use, system status and performance and overall status.

A primary objective of the present invention is to provide an apparatus and method of use of such apparatus that provides advantages not taught by the prior art.

Another objective is to provide such an invention capable of purifying air with respect to particulate, biological agents and chemical agents.

A further objective is to provide such an invention capable of adjusting makeup air percentage, as related to the level of sensed contamination in the environment, in order to maximize the useful life of the system.

A still further objective is to provide such an invention capable of simultaneously bombarding an air inflow with ions and with ultra-violet radiation.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above described drawing figures illustrate the invention in at least one of its preferred embodiments, which is further defined in detail in the following description.

Figure 1:
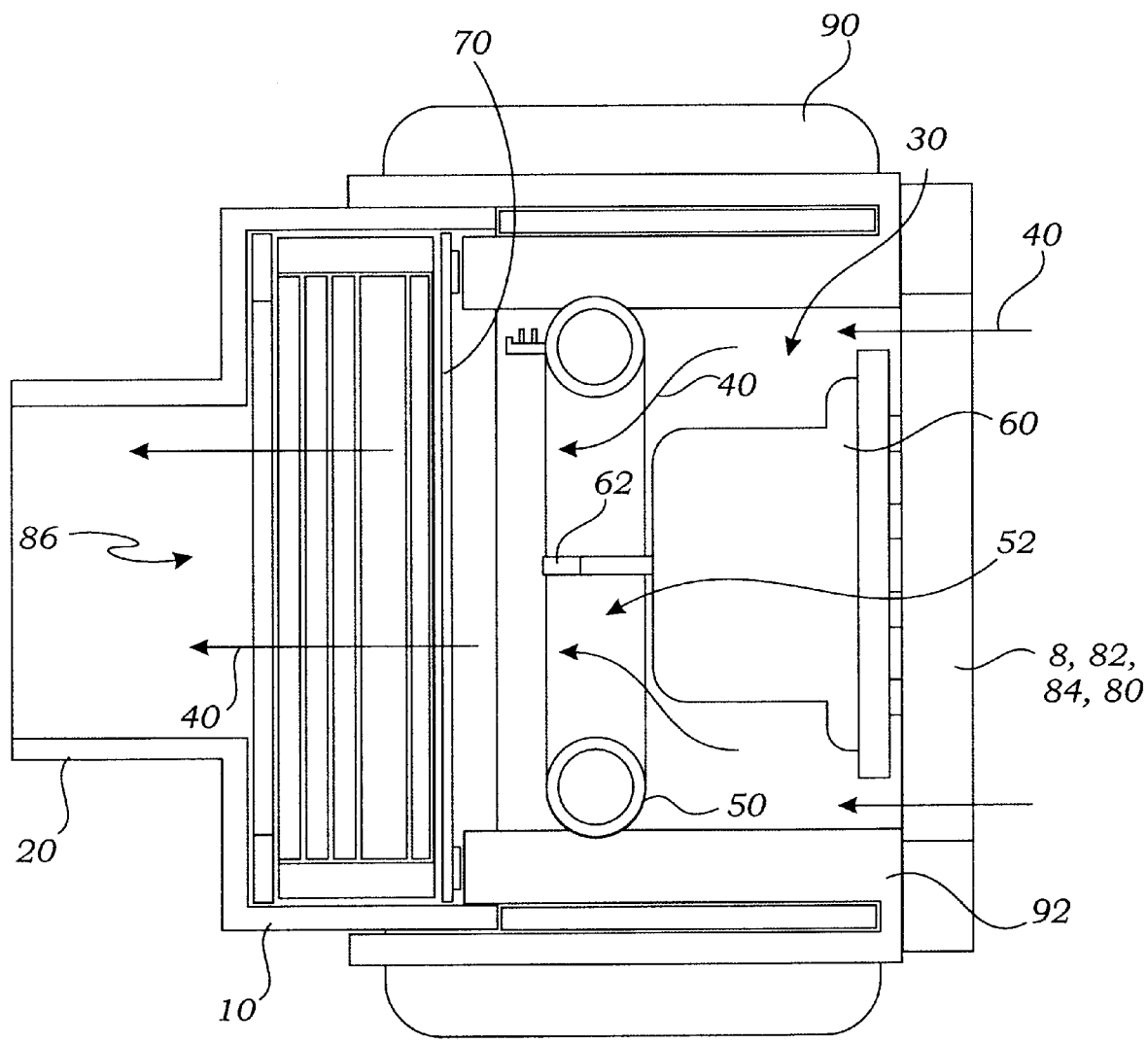
FIG. 1 is a vertical cross-sectional view of a round filter mask canister embodiment of the invention shown as a mechanical schematic.
Figure 2:
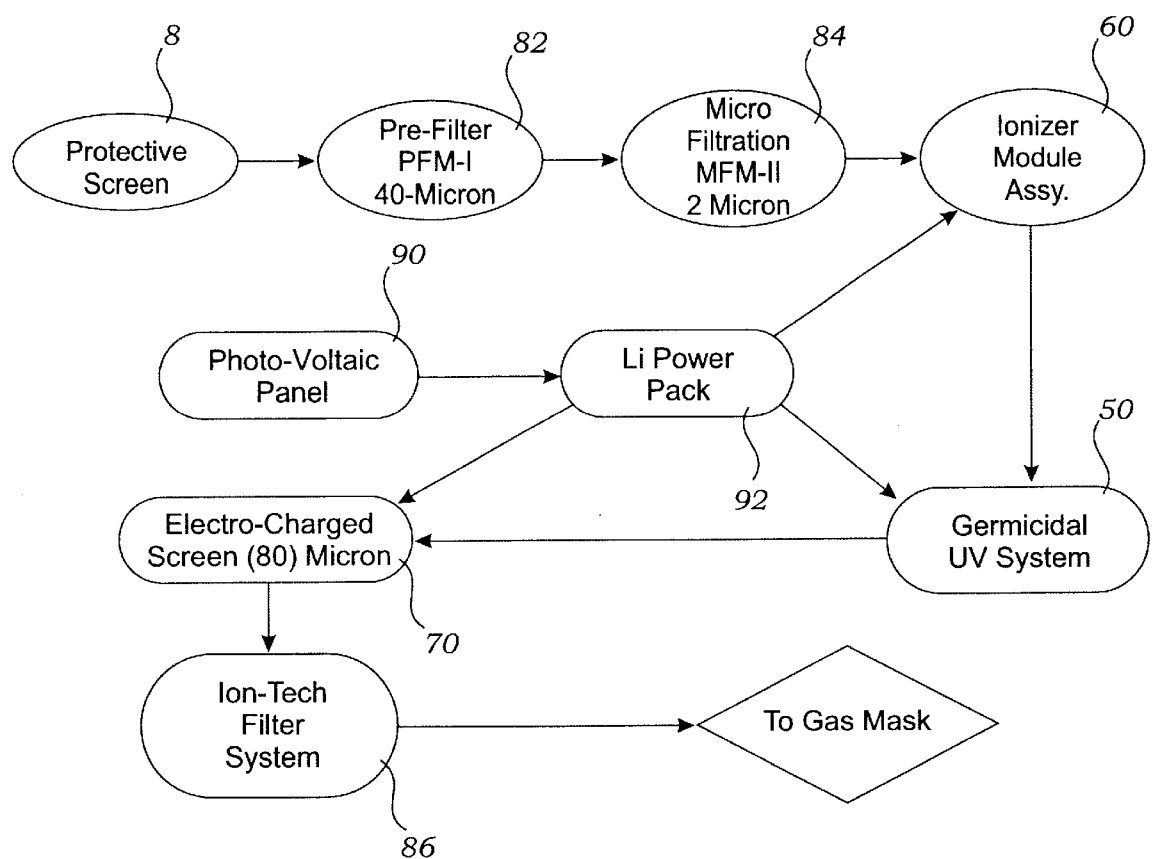
FIG. 2 is a process block diagram of the invention showing elements applied to personal embodiment of the invention.

The present invention is an air purification apparatus comprising, in a first preferred embodiment, a housing 10 as shown in FIG. 1. This housing 10 is preferably made of an engineering plastic and is rigid and durable. In one embodiment, the housing 10 is a purification canister and thus attaches to a personal protective mask, commonly known as a gas mask (not shown), for the protection of a person wearing the mask. In this use, a discharge conduit 20 of the housing 10 provides external threads (not shown) compatible with NBC mask specifications or other common fittings. In an alternate embodiment, other well-known fastening and connecting methods may be used, as will be evident from the discussion following.

By the force of breath inhalation, air inflow 40 moves into the apparatus through layers comprising a combination protective screen 80, a pre-filter 82 with a 40 micron maximum pore size, and a final filter 84 with a 2 micron maximum pore size. Other layers may be added depending upon the duty cycle and application.

The housing 10 defines a reception space 30, within the housing 10, for receiving the air inflow 40 drawn into the reception space 30. The air inflow 40 moves through an aperture 52 of a UV bombardment means 50; a circular, or other closed shape, ultraviolet lamp which provides ultraviolet energy radiation having a wavelength of approximately 254 nm. This radiant energy is directed into the aperture 52 at the center of the circular lamp so that the air inflow 40 is exposed to this energy for killing any live microorganisms within the air inflw 40. A means for ionizing, such as shown in FIG. 1 at numeral 60, is a high voltage generator producing a potential at electrode 62. The potential is high enough to cause ionization of the air inflow 40 and to produce a low level of ozone generation. The ions produced at the electrode 62 are attracted to and move to the surrounding surfaces which are at ground potential. This ionic flow causes destruction of living organisms in the aperture 52. It is considered an important improvement in the art to provide the closed aperture 52 through which the air inflow 40 must move under simultaneous UV and ion bombardment, and this combination has been shown, in our tests, to provide very high reliability in the reduction and complete elimination of microorganisms in the air inflow 40. FIG. 1 clearly shows the physical juxtaposition of the several elements described above with respect to the air inflow 40.

Upon moving through the UV bombardment means 50 and the ionizing means 60, the air inflow 40 moves through a means for electrostatic precipitation of particles 70, an electrically charged screen having a pore size of 80 microns maximum and an applied DC electrical potential, preferably at 12 VDC. Such a screen 70 is able to polarize particles in the air inflow 40 and capture them on the screen 70. From the screen 70, the air inflow 40 moves through Ion-Tech filter 86 comprised of plural layers of fine filtration, activated charcoal and resin beds for adsorption of chemical agents.

As described above, the housing 10 may be a personal protective mask canister, with the air inflow drawn into the housing 10 by user inhalation. In this case, a power unit provides a rechargeable battery 92 (lithium power pack), recharge circuitry and solar energy collector 90. Details of the construction and utilization of such a power unit are well known in the prior art.

Figure 3:
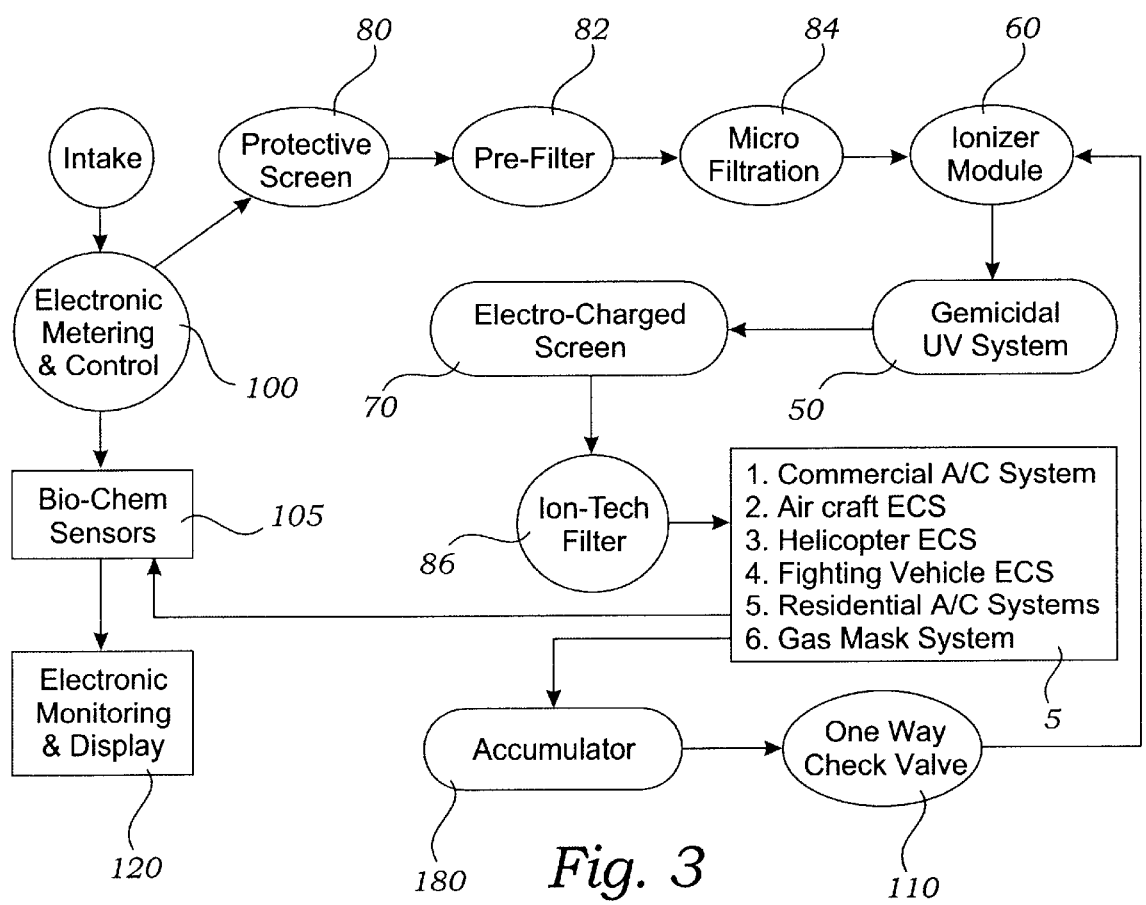
FIG. 3 is a process block diagram of the invention showing elements applied to a commercial or residential embodiment of the invention.
Figure 4:
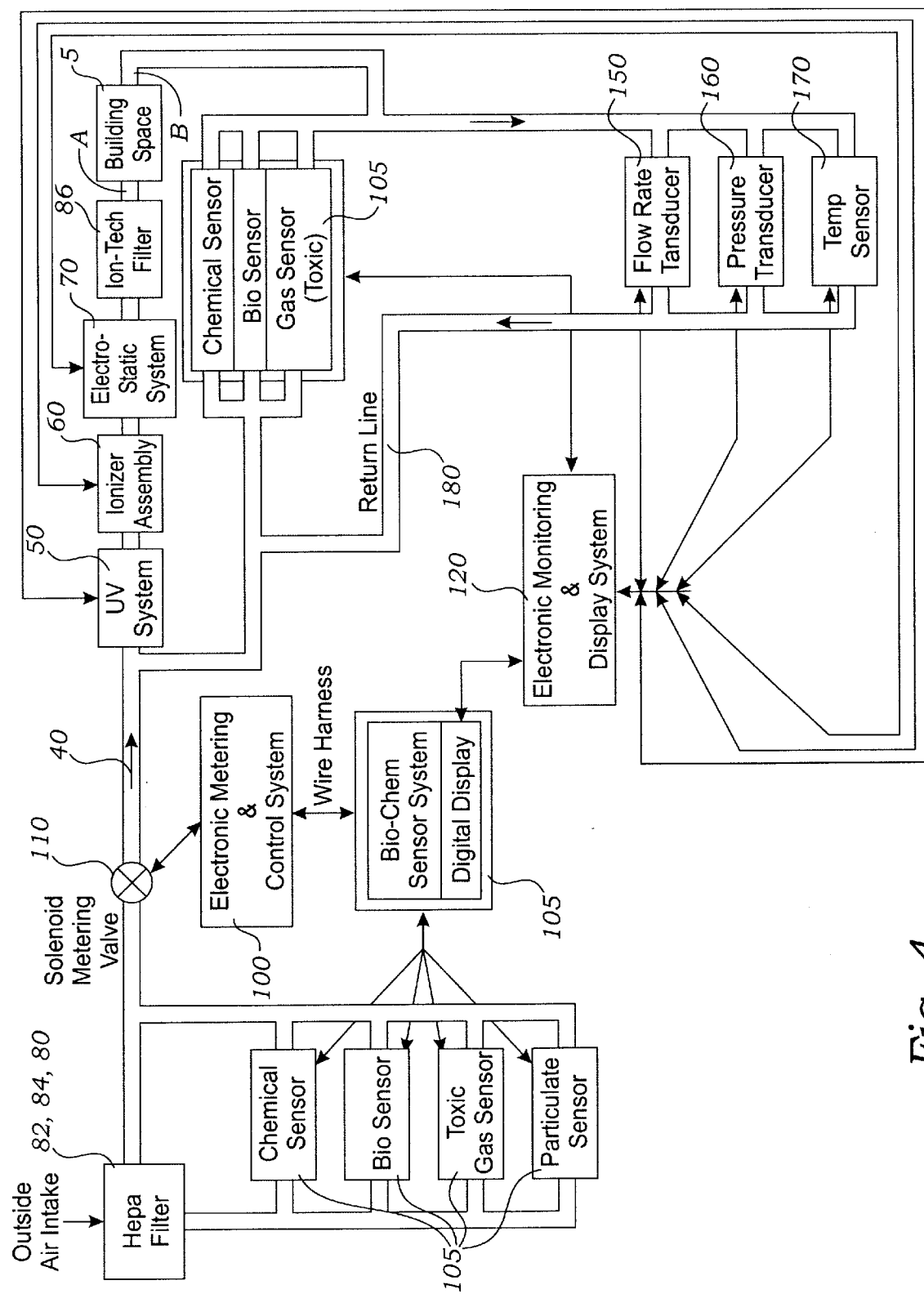
FIG. 4 is a diagram showing air flow and control in the embodiment of FIG. 3.

In an alternate embodiment of this invention the housing 10 may be sized to provide air purification for residential, commercial and industrial uses and, in this case, power is drawn from a conventional AC power source as needed. In these applications, a metering and control system 100 (FIGS. 3 and 4) provides the ability to sense the external environment, using well known and standard sensors 105, for chemical and biological agents as well as particulate such as smoke and vapors, and to adjust the level of makeup air drawn into the system through the use of a metering valve 110. This valve 110 enables air flow only when it is safe to provide makeup air as determined by the electronic metering and control 100. As shown in FIG. 4, the double lines represent gas flow paths, while the single lines represent electrical signal paths in the present invention system. This air flow system provides purified air flow into a building space 5, such as a residence, a storage facility, an office complex or any other closed building structure. Air is drawn into space 5 at point "A" in FIG. 4, by an air mover (not shown), and is drawn out of the space 5 at point "B" whereupon a sample of the air moves through chemical, biological and gas species sensors as are well known in the air. The bulk of the air moves through a flow rate transducer 150, a pressure transducer 160 and a temperature sensor 170 and into a return line 180. Air moves through the return line, is joined by makeup air drawn through the metering valve 110, and into the UV, ionizing, and electrostatic processors: 50, 60, 70 and the Ion-Tech filter pack 86; then into the building space 5. Preferably, an electronic processor and monitor 120 is provided to enable user control. Such control systems, their interconnection and use are very well known in the art.

While the invention has been described with reference to at least one preferred embodiment, it is to be clearly understood by those skilled in the art that the invention is not limited thereto. Rather, the scope of the invention is to be interpreted only in conjunction with the appended claims. Applicant hereby states that the following claims define the described invention.

What is claimed is:

1. An air purification apparatus comprising: a housing providing therein, a reception space for receiving an air inflow drawn into the reception space; a means for mechanical filtration and extraction of particles larger than approximately 2 micron in the air inflow, a means for ionizing of the air inflow with energetic ions; a means for bombardment of the air inflow with ultraviolet light radiation; and a means for electrostatic precipitation of particles in the air inflow; the ionizing means positioned integrally with the ultraviolet light radiation bombardment means.

2. The apparatus of claim 1 wherein the mechanical filtration means comprises a combination protective screen, a pre-filter with a 40 micron maximum pore size, and a final filter with a 2 micron maximum pore size.

3. The apparatus of claim 1 wherein the ultraviolet bombardment means is at least one ultraviolet radiant lamp producing light having a wavelength of approximately 254 nm.

4. The apparatus of claim 3 wherein the at least one ultraviolet radiant lamp forms a closed figure in shape, providing an aperture therethrough, the at least one lamp positioned within the reception space such that the air inflow moves through the aperture.

5. The apparatus of claim 4 wherein the ionizing means comprises a high voltage probe positioned within the aperture of the at least one lamp, the high voltage probe providing a voltage enabling the production of ozone within the air inflow.

6. The apparatus of claim 1 wherein the precipitation means comprises an electrically charged screen having a pore size of 80 microns maximum and an applied DC electrical potential.

7. The apparatus of claim 1 wherein the housing is a personal protective mask canister, and the air inflow is drawn into the housing by user inhalation.

8. The apparatus of claim 1 wherein the housing is an inlet to an air mover for a building space, wherein the air inflow is recycled; and further comprising a means for electronic metering and controlling of the air inflow.

9. The apparatus of claim 8 further comprising a means for sensing biological and chemical agents in the air inflow.

10. The apparatus of claim 8 further comprising a means for displaying status of the apparatus.

11. The apparatus of claim 8 further comprising a means for adding a controlled portion of make-up air into the air inflow.

12. An air purification method comprising the steps of: drawing an air inflow into a reception space of a housing; filtering particles larger than approximately 2 micron in the air inflow, ionizing the air inflow with energetic ions while simultaneously bombarding the air inflow with ultraviolet light radiation within an aperture of a closed loop ultraviolet lamp; and capturing particles from the air inflow using an electrostatic precipitator.

13. The method of claim 12 further comprising the steps of sensing chemical and biological agents in the air inflow and correspondingly adjusting the percent of a make-up air used to extend operating life.

* * * * *